G. A. MAHANEY.
TICKET HOLDER.
APPLICATION FILED MAR. 9, 1917.
1,253,070.
Patented Jan. 8, 1918.
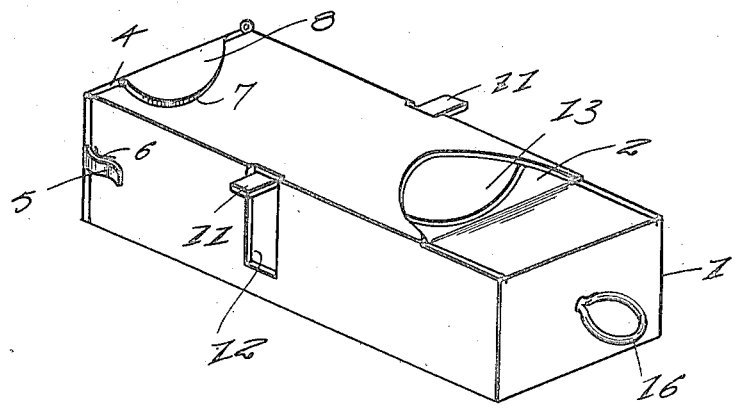
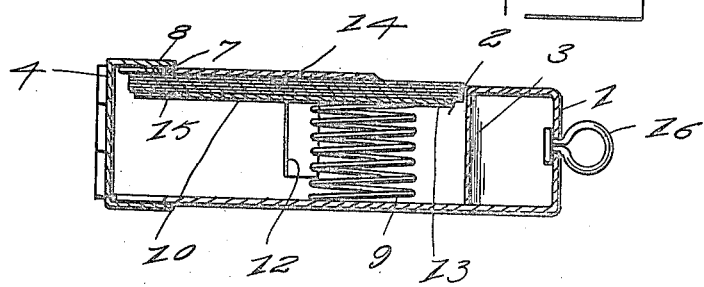
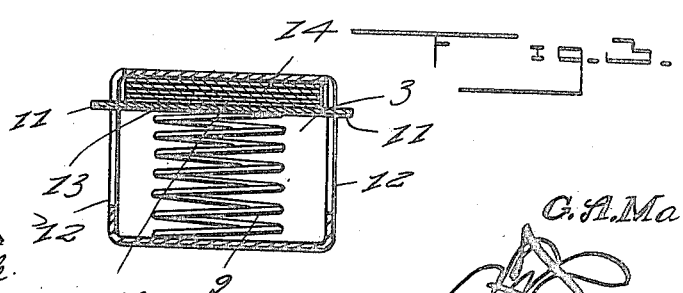
Witnesses
O. M. Bealle
N. F. Davidson
Inventor
G. A. Mahaney.
By
Attorney

UNITED STATES PATENT OFFICE.

GUY A. MAHANEY, OF JOKER, WEST VIRGINIA.

TICKET-HOLDER.

1,253,070.  Specification of Letters Patent.  Patented Jan. 8, 1918.

Application filed March 9, 1917. Serial No. 153,747.

*To all whom it may concern:*

Be it known that I, GUY A. MAHANEY, a citizen of the United States, residing at Joker, in the county of Calhoun and State of West Virginia, have invented certain new and useful Improvements in Ticket-Holders; and I do hereby declare the following to be a full, clear, and exact description of the invention, such as will enable others skilled in the art to which it appertains to make and use the same.

This invention relates to a ticket holder and has for one of its objects the provision of a device of this character, whereby a plurality of tickets may be stored and dispensed therefrom singly or in a bulk, when desired.

Another object of this invention is the provision of a casing having an outlet opening and a movable false bottom for supporting the tickets adjacent the outlet opening whereby they may be removed when desired.

A further object of this invention is the provision of a spring secured to the bottom wall of the casing and to the under face of the false bottom, which will permit the ends of the false bottom to move downwardly when withdrawing or replacing tickets within the casing.

A still further object of this invention is the provision of a ticket holder of the above stated character, which shall be simple, durable and efficient, and which may be manufactured and sold at a comparatively low cost.

With these and other objects in view, as will become more apparent as the description proceeds, the invention consists of certain novel features of construction, combination and arrangement of parts as will be hereinafter more fully described and claimed.

For a complete understanding of my invention, reference is to be had to the following description and accompanying drawings, in which:

Figure 1 is a perspective view of a ticket holder constructed in accordance with my invention, Fig. 2 is a longitudinal sectional view of the same, and Fig. 3 is a transverse sectional view illustrating oppositely disposed lugs projecting through the side walls of casing, for the purpose of moving the false bottom downwardly to insert tickets.

Referring in detail to the drawing, the numeral 1 indicates a substantially elongated casing having a semi-circular outlet opening 2 formed in the top wall thereof. A downwardly depending wall 3 is formed upon the straight edge of the semi-circular opening and engages the bottom wall of the casing as shown in Fig. 2, to form an abutment. One end of the casing 1 is open and adapted to be closed by a hinged door 4, having a resilient clip 5 adapted to engage a lug 6 formed upon one of the side walls of the casing, whereby the door is held in a closed position. The top and bottom walls of the casing adjacent the open end are provided with semi-circular openings 7, which are closed by lips 8, formed upon the upper and lower edges of the door 4.

A coiled spring 9 has one end thereof secured to the bottom wall of the casing and supports upon its upper end a false bottom 10, which has oppositely disposed lugs 11 formed thereon and which project through slots 12 formed within the side walls of the casing 1. The false bottom 10 has one end curved as shown at 13 and disposed directly under the semi-circular opening 2, while its opposite end terminates adjacent the door 4. The false bottom 10 is moved downwardly against the tension of the spring 9 by pressing upon the lugs 11 and opening the door 4, a plurality of tickets may be inserted upon the false bottom as illustrated at 14. Upon releasing the lugs 11, the coiled spring 9 urges the false bottom upwardly, tightly gripping the tickets between the top wall of the casing and the false bottom; when it is desired to remove a ticket from the casing, the thumb is placed within the semi-circular opening 2 upon the uppermost ticket and by applying pressure and moving the thumb simultaneously, the ticket will be withdrawn from the casing. As the uppermost ticket upon the false bottom 10 is gripped by the thumb, the forward end of the false bottom or the curved end 13 moves downwardly permitting the next adjacent ticket under the uppermost ticket to engage the abutment 3, preventing more than one ticket from being dispensed at one time.

If at any time, it is desired to remove all of the tickets from the casing, the door 4 is opened and by placing the fingers within the opening 7, the bulk of tickets may be removed simultaneously, the false bottom 10 being provided with a semi-circular opening 15, which will coöperate with the semi-circular opening 7 formed in the top wall for permitting the entire amount of tickets to be gripped simultaneously. Secured to the front end wall of the casing is a suitable loop or ring 16, to which a chain or other flexible element may be connected for securing the device to a person preventing theft and loss of the same.

While I have shown and described the preferred embodiment of my invention, it will be understood that minor changes in construction, combination and arrangement of parts may be made without departing from the spirit and scope of the invention as claimed.

What is claimed is:

1. A ticket holder comprising a casing having a semi-circular opening in the top thereof and adjacent one end, a downwardly depending wall formed upon the straight edge of the outlet opening and engaging the bottom wall of the casing to form an abutment, said casing having oppositely disposed slots in the side walls thereof, a hinged door closing one end of said casing, a false bottom located within said casing, oppositely disposed lugs formed upon said false bottom and projecting through the slots in the side walls of the casing, and a coiled spring secured to the bottom wall and to the under face of the false bottom for causing the false bottom to support tickets in engagement with the under face of the top wall.

2. A ticket holder comprising a casing having one end open, said casing having semi-circular openings in the top and bottom thereof at the open end thereof, a door hinged to said open end of the casing, lips formed on said door and adapted to close the semi-circular openings when in a closed position, said casing having a semi-circular opening in the top wall for permitting tickets to be withdrawn from the casing, a false bottom slidably mounted in said casing, and a coiled spring secured to the bottom wall of the casing and to the under face of the false bottom for normally urging the false bottom upwardly to bind tickets between the false bottom and the top wall of the casing.

In testimony whereof I affix my signature in presence of two witnesses.

GUY A. MAHANEY.

Witnesses:
J. N. BELL,
CHAS. STOUT.

Copies of this patent may be obtained for five cents each, by addressing the "Commissioner of Patents, Washington, D. C."